United States Patent
Seibt

(10) Patent No.: US 9,015,872 B2
(45) Date of Patent: Apr. 28, 2015

(54) SYSTEM FOR FLUSHING A VACUUM TOILET

(75) Inventor: Christian Seibt, Buchholz (DE)

(73) Assignee: Airbus Operations GmbH (DE)

( * ) Notice: Subject to any disclaimer, the term of this patent is extended or adjusted under 35 U.S.C. 154(b) by 1423 days.

(21) Appl. No.: 12/317,264

(22) Filed: Dec. 18, 2008

(65) Prior Publication Data

US 2009/0165197 A1    Jul. 2, 2009

Related U.S. Application Data

(60) Provisional application No. 61/008,243, filed on Dec. 19, 2007.

(30) Foreign Application Priority Data

Dec. 19, 2007  (DE) .......................... 10 2007 061 255

(51) Int. Cl.
| | | |
|---|---|---|
| *E03D 11/00* | (2006.01) | |
| *B64D 11/02* | (2006.01) | |
| *E03D 5/00* | (2006.01) | |
| *E03F 1/00* | (2006.01) | |

(52) U.S. Cl.
CPC ........ *B64D 11/02* (2013.01); *E03D 5/00* (2013.01); *E03F 1/006* (2013.01); *E03F 1/008* (2013.01); *Y02T 50/46* (2013.01)

(58) Field of Classification Search
CPC ................. B64D 11/02; E03F 1/006
USPC ............................ 4/301, 302, 431
See application file for complete search history.

(56) References Cited

U.S. PATENT DOCUMENTS

| | | | |
|---|---|---|---|
| 1,732,192 A | | 10/1929 | Lee |
| 4,120,312 A | * | 10/1978 | Michael ................... 137/236.1 |
| 4,928,326 A | | 5/1990 | Olin et al. |
| 4,991,623 A | * | 2/1991 | Ericson ................... 137/526 |
| 5,165,457 A | | 11/1992 | Olin et al. |
| 5,317,763 A | * | 6/1994 | Frank et al. .................. 4/434 |
| 6,082,979 A | | 7/2000 | Friedman |
| 6,216,285 B1 | * | 4/2001 | Olin ............................ 4/431 |
| 6,243,887 B1 | * | 6/2001 | Palffy et al. .................. 4/431 |
| 6,648,002 B2 | | 11/2003 | Lappalainen |

(Continued)

FOREIGN PATENT DOCUMENTS

| | | |
|---|---|---|
| DE | 38 11 162 | 10/1988 |
| DE | 102006016030 | 10/2007 |

(Continued)

OTHER PUBLICATIONS

Commonly owned pending U.S. Appl. No. 11/732,494, filed Apr. 3, 2007.

*Primary Examiner* — Janie Christiansen
(74) *Attorney, Agent, or Firm* — Lerner, David, Littenberg, Krumholz & Mentlik, LLP

(57) ABSTRACT

A system for flushing a vacuum toilet in an aircraft, with a bowl drain for removing toilet waste water from a bowl, a drain line, a bypass flow line for feeding-in air, a drainage valve and a waste water line. The bowl drain and the bypass flow line are connectable to the drain line, and the drainage valve on the input side is connectable to the drain line, and on the output side is connectable to a waste water line. In an implementation of the vacuum toilet as a vacuum urinal, the system may provide either water flushing or waterless flushing.

15 Claims, 3 Drawing Sheets

(56) References Cited

U.S. PATENT DOCUMENTS

| | | | |
|---|---|---|---|
| 7,246,386 B2 * | 7/2007 | Hall | 4/301 |
| 2003/0167561 A1 * | 9/2003 | Nilsson | 4/301 |
| 2006/0225200 A1 * | 10/2006 | Wierenga | 4/664 |
| 2007/0245473 A1 | 10/2007 | Seibt et al. | |
| 2008/0185477 A1 | 8/2008 | Seibt | |
| 2008/0201832 A1 | 8/2008 | Seibt | |

FOREIGN PATENT DOCUMENTS

| DE | 102007004831 | 8/2008 |
|---|---|---|
| DE | 102007004832 | 8/2008 |

* cited by examiner

SYSTEM FOR FLUSHING A VACUUM TOILET

CROSS-REFERENCE TO RELATED APPLICATIONS

This application claims the benefit of the filing date of U.S. Provisional Patent Application No. 61/008,243 filed Dec. 19, 2007, the disclosure of which is hereby incorporated herein by reference.

BACKGROUND OF THE INVENTION

The invention relates to a system for flushing a vacuum toilet in an aircraft.

Known flushing devices for a vacuum toilet or for a vacuum urinal require that after use a flushing process be initiated by operating a triggering device. This is then followed first by the supply of flushing liquid to the vacuum toilet and subsequently by the closing of a check valve and the opening of a suction valve, so as to lead urine, flushing liquid, solids and any other impurities into the region of a waste water tank. In this arrangement the transport process usually takes place by a pressure differential between the essentially evacuated waste water tank and a space surrounding the vacuum toilet. In conventional systems the air flows resulting from this pressure differential generate considerable noise emission during the flushing process, which no longer meet the increased level of comfort demanded in modern aircraft. The noise emission is still further magnified by the funnel effect of the bowl.

Furthermore, flushing requires a significant quantity of flushing liquid that has to be stored on board in the form of additional weight.

BRIEF SUMMARY OF THE INVENTION

According to an exemplary embodiment of the present invention, a system for flushing a vacuum toilet in an aircraft is provided, which system comprises a bowl drain for removing toilet waste water from a bowl, a drain line, a bypass flow line for feeding-in air, a drainage valve and a waste water line, wherein the bowl drain and the bypass flow line are connectable to the drain line, and wherein the drainage valve on the input side is connectable to the drain line, and on the output side is connectable to a waste water line.

This may provide for a system for flushing a vacuum toilet in which system the noise emission that occurs during a flushing process is low. This may also provide for optimising the system and the components used in the system as far as their weight, reliability, sound reflection, design size, odour reflection, water consumption and electricity consumption are concerned.

Such a system comprises an advantage in that the air stream resulting from the pressure differential is not exclusively provided through the drain opening of the bowl with high noise emission, but instead is supplemented by a separate bypass flow line that leads into the drain line. With the mass flow remaining the same, a flow cross section that is larger overall reduces the flow speeds that occur, and at the same time clearly reduces the flow noise.

Improvements of the invention are stated in the subsidiary claims.

Furthermore, this may provide for a vacuum toilet that comprises the system according to the invention, by a method for flushing a vacuum toilet according to the invention, and by an aircraft comprising one or several vacuum toilets according to the invention, as stated in the secondary independent claims.

BRIEF DESCRIPTION OF THE DRAWINGS

Below, the invention is explained in more detail with reference to the figures. In the figures, identical objects are designated with the use of the same reference characters. The following are shown.

DETAILED DESCRIPTION

Figure 1:
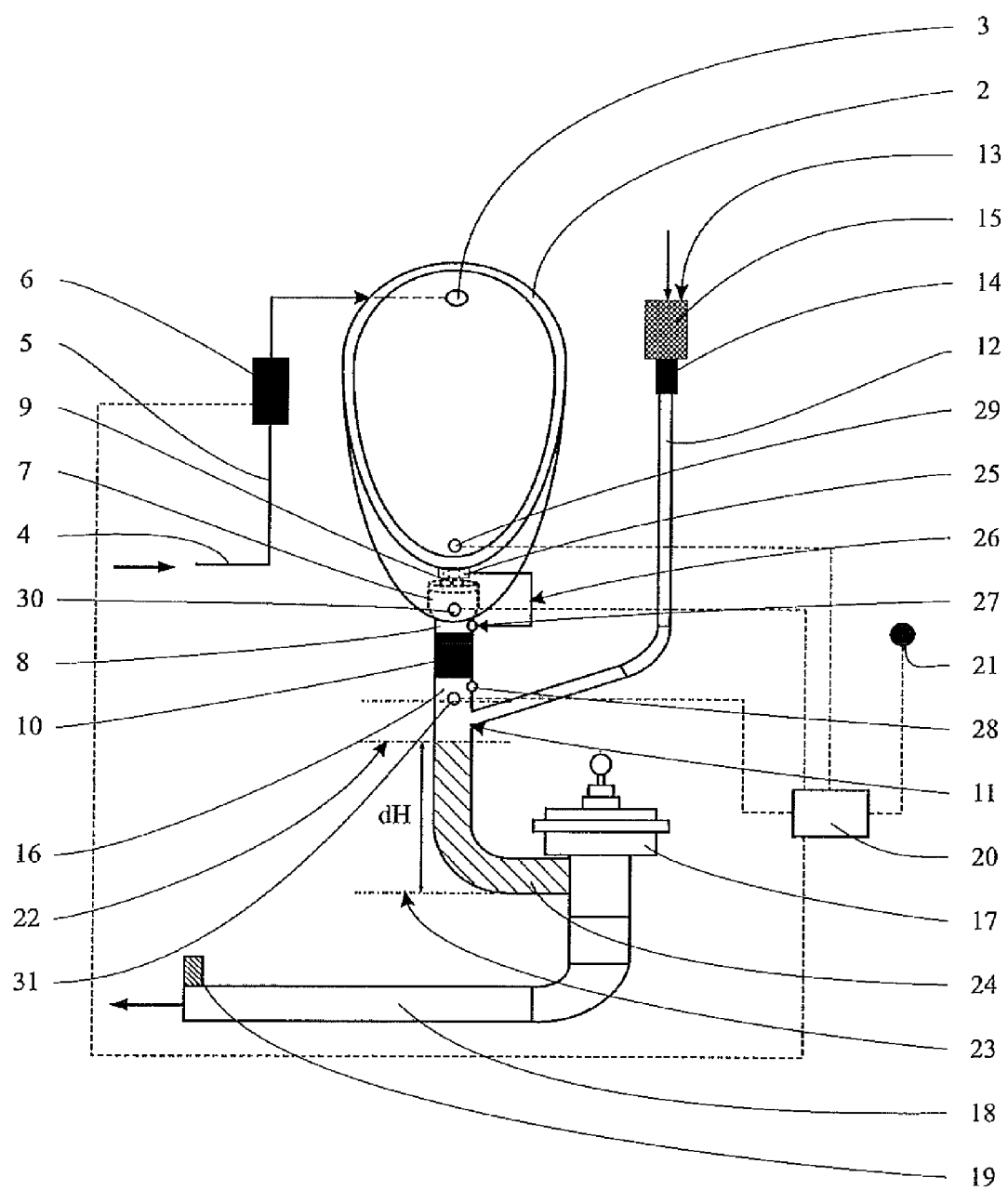
FIG. 1: a diagrammatic view of a first exemplary embodiment.

The first exemplary embodiment, shown in FIG. 1, of a system according to the invention in an exemplary manner shows a vacuum urinal with a urinal bowl 2, with a urinal bowl drain 7 that is connected to a drain line 8, as well as a bypass flow line 12 that leads into the drain line 16. The drain line 16 is connectable to a vacuum system 19 by way of an aircraft drainage valve 17 and a waste water line 18. The bypass flow line 12 is connected to the drain line 16 by way of a coupling 11, wherein said bypass flow line 12 makes it possible to reduce the pressure differential during the draining procedure of the aircraft drainage valve 17 by way of a standard odour seal 10. The air required for draining is to a large extent supplied by way of the bypass flow line 12. In principle, in this context it must be ensured that, depending on the design of the standard odour seal 10, its flow resistance that influences the flow-mechanical dimensioning of the drain and of the bypass, and thus the resulting pressure loss, differs in extent. By venting the drain line 16 by way of the bypass flow line 12 it becomes possible to use commercial odour seals that have proven reliable in sanitary technology. In this arrangement, known odour seals for urinal drains are, among other designs, designed as membranes and lift bodies; they fulfil several functions, in particular the drainage of liquid from the urinal bowl drain, venting of the drain line, and blocking any unpleasant odours that arise from the pipe architecture to the environment.

An additional odour seal 14 is arranged on the upper end of the bypass flow line 12, which odour seal 14 stops any odour from the bypass flow line 12 from being discharged to the environment. As a result of the clearly spaced-apart arrangement of the odour seal 14 from the drain line 16 and the fact that only air flows through said odour seal 14, the odour seal 14 needs to meet less stringent technical requirements than is the case with the standard odour seal 10 in the urinal bowl drain line 8, which standard odour seal 10 establishes direct contact with the materials to be led away. In addition, on the end of the bypass flow line 12, which end supplies ambient air, a silencer 15 may be arranged so that the noise emission arising there is very low.

In the first exemplary embodiment the urinal comprises a flushing water supply 4. A corresponding waterless system is furthermore explained below with reference to FIG. 2. In the case of a flushing water supply, by way of a flushing valve 6 and a flushing ring or flushing nozzles 5, flushing water is fed into the urinal bowl 2 from the flushing water supply 4 by means of the flushing line 5, wherein the flushing valve 6 may be controlled by a control unit 20. It is imaginable that the control unit 20 initiates triggering of the flushing valve as soon as a user steps towards the urinal, or in a time-delayed manner, wherein the time delay may be equal to the duration of use. To this effect a sensor 30 could register when a user approaches and moves away; it could be designed as a temperature sensor, distance sensor, light barrier or some other user detection sensor. The installation position, angle of view/focal length of the sensor 30 and its sensitivity should be determined such that the direct user of the urinal is registered. Any malfunctions such as a defective or blocked aircraft drainage valve 17 may be detected by a fill level sensor 31 in the drain line 16, which fill level sensor 31 might result in the flushing valve 6 closing by way of the control unit 20 until the fault is rectified. A further fill level sensor 29 in the urinal bowl 2 in turn also leads to the flushing valve 6 closing if a rising liquid level in the urinal bowl 2 arises as a result of a defective aircraft drainage valve 17 and/or a defective fill level sensor 31 in the drain line and/or a blocked sieve 9. If the liquid level in the urinal bowl continues to rise, caused by a blocked sieve 9, the liquid is removed by way of the overflow line 26. In the case of a waterless urinal, which is operated without a flushing water supply, provision of the control unit 20 is not mandatory.

For improved cleaning of the urinal bowl 2 its surface may comprise a suitable anti-adhesive surface coating. In particular in the case of designing a waterless urinal an anti-adhesive surface coating should be applied to the urinal bowl surface in order to support gravity-operated urine removal from the wall of the urinal bowl.

The propagation of remaining noise emission emanating from the system according to the invention may be further reduced in that all the system components, except for the urinal bowl 2, are arranged behind a sound-absorbent lining.

In the drainage process the valve opening time of the (mechanical) aircraft drainage valve 17 depends on the quantity of liquid to be removed. Opening of the valve 17 may, for example, be triggered automatically by the hydrostatic pressure in the drain line 16. Since during cruising the air pressure in the cabin exceeds the atmospheric air pressure surrounding the aircraft, the drainage valve 17 is kept in a closed state. If the water column located in the drain line 16 rises as a result of liquid draining away, analogously to this the hydrostatic pressure acting on a membrane surface in the drainage valve 17 increases, which membrane surface consequently curves upwards. If a predefined maximum water column (in FIG. 1 designated "dH") with corresponding hydrostatic pressure is attained, a draining pin coupled to the membrane lifts from its corresponding seat, thus releasing an outlet opening to the vacuum system 19, which results in the liquid that is present draining into the vacuum system 19. In addition, the valve 17 may also be manually opened by way of a draining pin. Furthermore, the drainage valve 17 opens automatically if the air pressure in the cabin becomes similar to the atmospheric air pressure. This case occurs if the aircraft is on the ground and if a vacuum generator situated on the ground is not in operation. The liquid present at the aircraft drainage valve 17 may thus be drained almost completely into the vacuum system 19.

To be on the safe side, the end of the aircraft drainage valve 17, which end points to the vacuum system 19, comprises a nonreturn valve. For operation in the vacuum system 19, downstream of the existing nonreturn valve a further nonreturn valve, or similar equipment with an identical function, is to be provided so as to prevent return flow from the vacuum system 19 into the aircraft drainage valve 17. Finally, the aircraft drainage valve should be optimised as far as the liquid to be removed is concerned so that the membrane material, the membrane size relative to an enlarged outlet opening, and the gap dimensions of the mechanics are to be designed accordingly.

Figure 2:
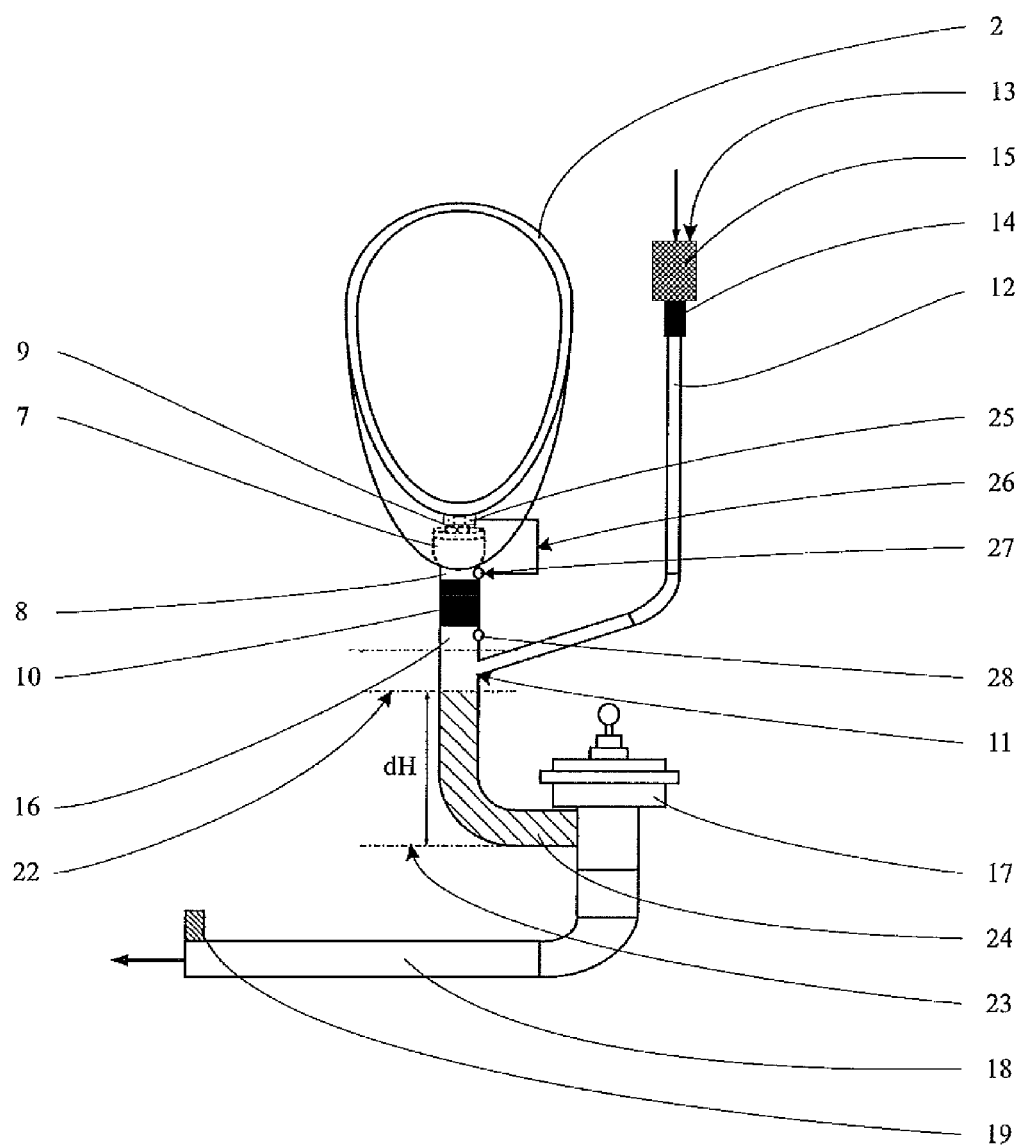
FIG. 2: a diagrammatic view of a second exemplary embodiment.

Finally, any entry of coarser impurities into the system may be prevented by a sieve, that is easy to clean, upstream of the urinal bowl drain 7 and upstream of the overflow 25. FIG. 2 presents a system for flushing a waterless vacuum urinal. The essential difference to the water-flushed vacuum urinal from FIG. 1 consists of the recommended control unit 20 and sensors 29-31 not being used. However, the essential functions of the system and of the associated components correspond to those already described above.

The urinal bowl 2 comprises an urinal bowl drain 7 that is connected to a urinal bowl drain line 8. According to this exemplary embodiment, upstream of the urinal bowl drain 7 a sieve 9 is provided that retains any foreign matter that must not reach the drain line 8, 16. A sieve 9 upstream of the overflow 25 may also be used with a correspondingly suitable design of the overflow 25 and the overflow line 26, however, other devices for separating conveyed matter that must not be conveyed from the urinal bowl 2 to the drain line 16 are also suitable.

Optimum geometry of the urinal bowl wall in connection with an anti-adhesive surface coating supports gravity-driven draining of the liquids from the surface of the urinal bowl.

By means of a coupling 11, the bypass flow line 12 leads into the drain line 16. The end 13 of the bypass flow line 12, which end points to the surroundings, comprises an odour seal 14 and a silencer 15. The odour seal 14 and the silencer 15 are arranged above the coupling 11. According to this exemplary embodiment, the arrangement of the silencer 15 and of the odour seal 14 is such that an air inlet opening of the silencer 15 and of the odour seal 14 is located above a maximum possible liquid level. In this arrangement the odour seal 14 is arranged downstream of the silencer 15, wherein the silencer 15 is preferably optionally used only in the case of higher flow speeds in the bypass flow line 12. Higher flow speeds in the bypass flow line 12 may be prevented by a pipe diameter that has been selected to be correspondingly large. Furthermore, the silencer 15 may also reduce draining noises emanating from the aircraft drainage valve 17. Only with the use of the bypass flow line does it become technically possible to use commercial odour seals that have proven reliable in sanitary applications.

Downstream of the coupling 11 the other end of the drain line 16 leads into an aircraft drainage valve 17. The aircraft drainage valve 17 is connected to a waste water line 18 which in turn is connected to the vacuum system 19 that generates a vacuum and resulting from it in the waste water line 18 a suction-induced airstream. The aircraft drainage valve 17 is opened and closed by way of the hydrostatic pressure of the liquid column that is present, which liquid column moves between the maximum fill level 22 and the minimum fill level 23. In the open state of the aircraft drainage valve 17 the liquid that is present is drained, and the required quantity of air is largely fed by way of the bypass flow line 12. Drainage into the vacuum system 19 is not manually carried out by means of a triggering device, but instead automatically by way of the hydrostatic pressure upstream of the aircraft drainage valve 17.

With the use of a mechanical aircraft drainage valve 17, which has been proven reliable in aircraft applications, with further described functionalities from the first exemplary embodiment it is possible to achieve great reliability with a small design size and a light weight which features low noise emission during the flushing process. In the case of a blocked draining pin the function of the aircraft drainage valve 17 may be restored in that the draining pin is pulled up and then down again. The possibility of rendering the aircraft drainage valve 17 operative again without incurring any installation expense provides advantages when compared to an electro-mechanical solution that cannot be rendered operative again in flight. Noise generation by a vacuum toilet, and in particular of a vacuum urinal, may be significantly reduced with the use of an aircraft drainage valve which requires little air during the draining process by way of the bypass flow line 12, when compared to flushing processes associated with conventional vacuum toilet technology that uses high volume flows during the flushing process.

Furthermore, with the use of odour seals 10, 14 that have been proven reliable in sanitary applications, as a result of product optimisation over many years, great reliability may be achieved. These products will require approval for use in aircraft applications, and corresponding certification will need to be carried out.

In order to prevent overfilling of the urinal bowl 2 in the case of a blocked sieve 9, an overflow 25 is to be provided. Feeding-in the liquid to be drained is generally possible upstream or downstream of the standard odour seal 10. Positions 27 and 28 are imaginable for connection of the overflow line 26. It should be noted that feeding-in at position 28 would require a further odour seal in the overflow line 26.

Furthermore, a significant weight advantage may be achieved as a result of the waterless flushing process. Such weight saving may result in reduced fuel consumption due to the reduced need for carrying fresh water. The exclusively mechanical function of the components or of the system obviates the need for electrical interfaces between the aircraft and the vacuum urinal, so that there is no longer any electricity consumption associated with these.

Figure 3:
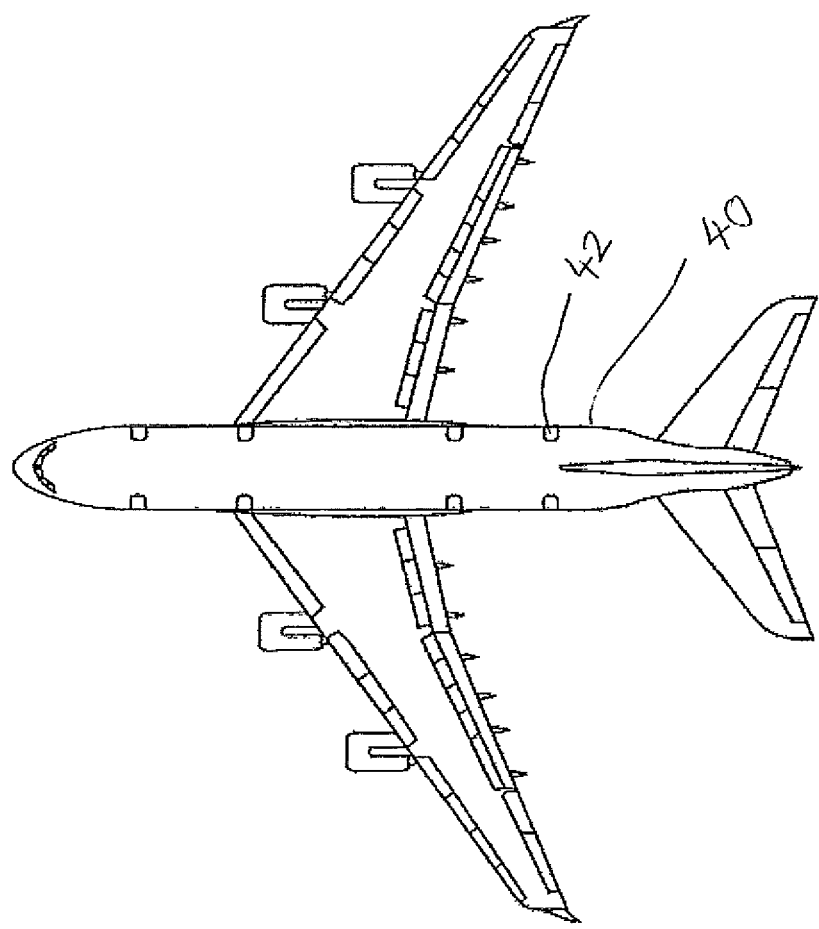
FIG. 3: a diagrammatic view of an aircraft including a vacuum toilet according to an embodiment of the invention.

FIG. 3 diagrammatically illustrates an aircraft 40 which includes a vacuum toilet 42. Vacuum toilet 42 may be similar to the systems illustrated in FIGS. 1 and 2.

Although, above, the invention has been described with reference to a preferred exemplary embodiment, various alterations and modifications may be made without leaving the scope of protection of the invention. The invention may also be used in areas other than aviation, for example in trains or ships where vacuum toilets are also used and where there is a problem of reducing noise emission. Furthermore, other switch-on times for the suction valve and the flushing valve may be set depending on the dimensioning of the vacuum toilet.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

2 Urinal bowl
3 Flushing ring or flushing nozzle(s)
4 Flushing water supply
5 Flushing line
6 Flushing valve
7 Urinal bowl drain
8 Urinal bowl drain line
9 Sieve
10 Standard odour seal of the drain line of the urinal bowl
11 Coupling
12 Bypass flow line
13 One end of the bypass flow line
14 Odour seal of the bypass flow line
15 Silencer (optional)
16 Drain line
17 Aircraft drainage valve
18 Waste water line
19 Vacuum system
20 Control unit (control device)
21 Triggering device
22 Maximum fill level
23 Minimum fill level
24 Effectively useable storage volume (pipe volume)
25 Overflow
26 Overflow line
27 Overflow inlet 1
28 Overflow inlet 2
29 Fill-level sensor of the urinal bowl
30 Sensor
31 Fill-level sensor of the drain line

The invention claimed is:

1. A system for flushing a vacuum toilet in an aircraft, comprising:
a bowl drain for removing toilet waste water from a bowl,
a drain line,
a bypass flow line for feeding-in air from ambient atmosphere to the drain line, thereby reducing the air intake from the bowl drain,
a drainage valve, and
a waste water line,
wherein the bowl drain is connected to the drain line;
wherein the bypass flow line is connected to the drain line between the drainage valve and the bowl drain, and
wherein the drainage valve on an input side is connectable to the drain line, and on an output side is connectable to the waste water line.

2. The system of claim 1, further comprising an odor seal arranged on the bypass flow line at its end opposite the drain line.

3. The system of claim 1, further comprising a silencer arranged on the bypass flow line at its end opposite the drain line.

4. The system of claim 1, further comprising an odor seal arranged between the bowl drain and the drain line.

5. The system of claim 1, further comprising a flushing device comprising one or more of flushing rings or flushing nozzles, a flushing water supply, a flushing line for connecting the flushing rings or flushing nozzles to the flushing water supply, and a flushing valve.

6. The system of claim 1, further comprising a fill-level measuring device in the bowl.

7. The system of claim 1, further comprising a fill-level measuring device in the drain line.

8. The system of claim 1, further comprising a control unit for controlling flushing functions of the vacuum toilet.

9. The system of claim 8, wherein the control unit is equipped for closing a flushing valve in the case of malfunction of components.

10. The system of claim 8, wherein the control unit is equipped for triggering a flushing process when at least one of a triggering device is activated or a user is detected before or after use.

11. The system of claim 1, further comprising at least one odor seal, wherein one of the at least one odor seal is configured as a membrane odor seal.

12. A vacuum toilet comprising:

a bowl drain for removing toilet waste water from a bowl, a drain line, a bypass flow line for feeding-in air, a drainage valve, a waste water line, and a sanitary odor seal disposed between the bowl drain and the drain line, wherein the bowl drain is connected to the drain line;

wherein the bypass flow line is connected to the drain line between the drainage valve and the bowl drain, and wherein the drainage valve on an input side is connected to the drain line, and on an output side is connectable to the waste water line.

13. The vacuum toilet of claim 12, wherein the vacuum toilet is configured as a vacuum urinal.

14. A method for flushing a vacuum toilet comprising a bowl drain for removing toilet waste water from a bowl, a drain line, a bypass flow line for feeding-in air, a drainage valve and a waste water line, wherein the bowl drain and the bypass flow line are connectable to the drain line, and wherein the drainage valve on an input side is connectable to the drain line, and on an output side is connectable to the waste water line, the method comprising:

feeding air from the ambient atmosphere via a bypass flow line into the drain line between the drainage valve and the bowl drain during removal of the content of the bowl by way of the drain line into the waste water line.

15. An aircraft comprising one or more vacuum toilets each comprising a bowl drain for removing toilet waste water from a bowl, a drain line, a bypass flow line for feeding-in air from ambient atmosphere to the drain line, thereby reducing the air intake from the bowl drain, a drainage valve and a waste water line, wherein the bowl drain is connected to the drain line;

wherein the bypass flow line is connected to the drain line between the drainage valve and the bowl drain, and wherein the drainage valve on an input side is connected to the drain line, and on an output side is connectable to the waste water line.

\* \* \* \* \*